(12) United States Patent
Eller et al.

(10) Patent No.: US 9,501,062 B2
(45) Date of Patent: Nov. 22, 2016

(54) ROTOR MOMENT FEEDBACK FOR STABILITY AUGMENTATION

(71) Applicant: Sikorsky Aircraft Corporation, Stratford, CT (US)

(72) Inventors: Erez Eller, Oakville, CT (US); Ole Wulff, Ansonia, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/075,830

(22) Filed: Mar. 21, 2016

(65) Prior Publication Data
US 2016/0202705 A1  Jul. 14, 2016

Related U.S. Application Data

(62) Division of application No. 14/159,600, filed on Jan. 21, 2014, now Pat. No. 9,317,041.

(51) Int. Cl.
| | |
|---|---|
| *G05D 1/00* | (2006.01) |
| *G08B 21/00* | (2006.01) |
| *G05D 1/08* | (2006.01) |
| *B64C 27/32* | (2006.01) |
| *B64C 27/57* | (2006.01) |

(52) U.S. Cl.
CPC ............ *G05D 1/0816* (2013.01); *B64C 27/32* (2013.01); *B64C 27/57* (2013.01); *G05D 1/0858* (2013.01)

(58) Field of Classification Search
CPC . F03D 7/0224; Y02E 10/723; Y02E 10/722; F05B 2260/96; F05B 2270/101; F05B 2270/1033; F05B 2270/1095; F05B 2270/20; F05B 2270/32; F05B 2270/331; F05B 2270/402; B64C 11/06; F42C 15/22

USPC ............. 701/3, 4, 5, 6, 7, 8, 11, 14, 16; 244/75.1, 76 R; 340/945

See application file for complete search history.

(56) References Cited

U.S. PATENT DOCUMENTS

| 2,631,679 A | 3/1953 | Hiller, Jr. et al. |
| 3,008,670 A | 11/1961 | Guarino, et al. |

(Continued)

FOREIGN PATENT DOCUMENTS

| WO | 2013097860 A1 | 7/2013 |
| WO | 2013152767 A1 | 10/2013 |
| WO | WO-2013-152767 | * 10/2013 |

OTHER PUBLICATIONS

International Search Report and Written Opinion for PCT Application No. PCT/US15/11906, dated Sep. 23, 2015, pp. 1-12.

*Primary Examiner* — Muhammad Shafi
(74) *Attorney, Agent, or Firm* — Cantor Colburn LLP

(57) ABSTRACT

Disclosed is a rotorcraft including a plurality of blades, and a control computer configured to obtain a blade bending measurement from a sensor associated with a one of the plurality of blades, process, by a device comprising a processor, the blade bending measurement to obtain moment data for the rotorcraft, obtain data from an inertial measurement unit (IMU), wherein the data obtained from the IMU pertains to at least one of a pitch of the aircraft and an angular rate, and process, by the device, the moment data and the data from the IMU to generate a command configured to stabilize the aircraft, wherein the command is based on a reference input, and wherein the reference input is based on at least one input provided by a pilot of the aircraft.

7 Claims, 4 Drawing Sheets

(56) References Cited

U.S. PATENT DOCUMENTS

| | | |
|---|---|---|
| 4,519,743 A | 5/1985 | Ham |
| 4,725,020 A | 2/1988 | Whitener |
| 4,797,829 A | 1/1989 | Martorella et al. |
| 5,163,011 A * | 11/1992 | Gunsallus ............ G01L 5/0061 340/603 |
| 6,189,836 B1 | 2/2001 | Gold et al. |
| 7,970,498 B2 | 6/2011 | Sahasrabudhe et al. |
| 2004/0054488 A1 * | 3/2004 | Mai ........................ G01C 11/00 702/104 |
| 2006/0269413 A1 * | 11/2006 | Cotton ................... B64C 27/10 416/170 R |
| 2011/0054721 A1 | 3/2011 | Goodrich et al. |
| 2011/0158806 A1 | 6/2011 | Arms et al. |
| 2015/0078895 A1 * | 3/2015 | Odgaard ............... F03D 7/0224 416/1 |

* cited by examiner

ROTOR MOMENT FEEDBACK FOR STABILITY AUGMENTATION

CROSS-REFERENCE TO RELATED APPLICATIONS

This application claims priority to U.S. patent application Ser. No. 14/159,600, which was filed on Jan. 21, 2014, the contents of which are incorporated herein by reference.

BACKGROUND

Stiff hingeless rotors commonly found on high speed vertical takeoff and landing (VTOL) aircraft are relatively unstable in terms of, e.g., pitch moment versus angle of attack. A relatively large horizontal stabilizer may be required to provide restoring force to counteract this instability. The stabilizer itself is typically associated with a weight penalty, in addition to weight penalties in the tail cone and the rotor to react to large stabilizer loads. There may also be a drag penalty for the large stabilizer, as well as the center of gravity (CG) being pushed aft.

Conventional control systems have used stability augmentation systems (SAS) that sense angular aircraft rate feedback to increase stability. In other instances, angular acceleration feedback was used to improve stability. Differentiation of angular rate provides an acceleration signal with significant noise content. Filtering may enhance the signal-to-noise ratio (SNR) of the acceleration signal so as to be useful, but it may limit the effectiveness of the acceleration feedback to enhance aircraft stability.

BRIEF SUMMARY

Disclosed is a rotorcraft including a plurality of blades, and a control computer configured to obtain a blade bending measurement from a sensor associated with one of the plurality of blades, process, by a device comprising a processor, the blade bending measurement to obtain moment data for the rotorcraft, obtain data from an inertial measurement unit (IMU), wherein the data obtained from the IMU pertains to at least one of a pitch of the aircraft and an angular rate, and process, by the device, the moment data and the data from the IMU to generate a command configured to stabilize the aircraft, wherein the command is based on a reference input, and wherein the reference input is based on at least one input provided by a pilot of the aircraft.

In addition to one or more of the features described above or below, or as an alternative, further embodiments could include a first rotor and a second rotor, the plurality of blades including a first plurality of blades associated with the first rotor and a second plurality of blades associated with the second rotor.

In addition to one or more of the features described above or below, or as an alternative, further embodiments could include wherein the blade bending measurement includes a first blade measurement from the first plurality of blades and a second blade measure measurement from the second plurality of blades.

In addition to one or more of the features described above or below, or as an alternative, further embodiments could include wherein the control computer is configured to average the first blade bending measurement and the second blade bending measurement in obtaining the moment data.

In addition to one or more of the features described above or below, or as an alternative, further embodiments could include a slipring configured to transfer the blade bending measurement to the control computer.

In addition to one or more of the features described above or below, or as an alternative, further embodiments could include wherein the control computer is configured to obtain a third blade bending measurement from a sensor associated with the plurality of blades, and process the third blade bending measurement in obtaining the moment.

In addition to one or more of the features described above or below, or as an alternative, further embodiments could include wherein moment data for the rotorcraft includes pitch moment data.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1A:
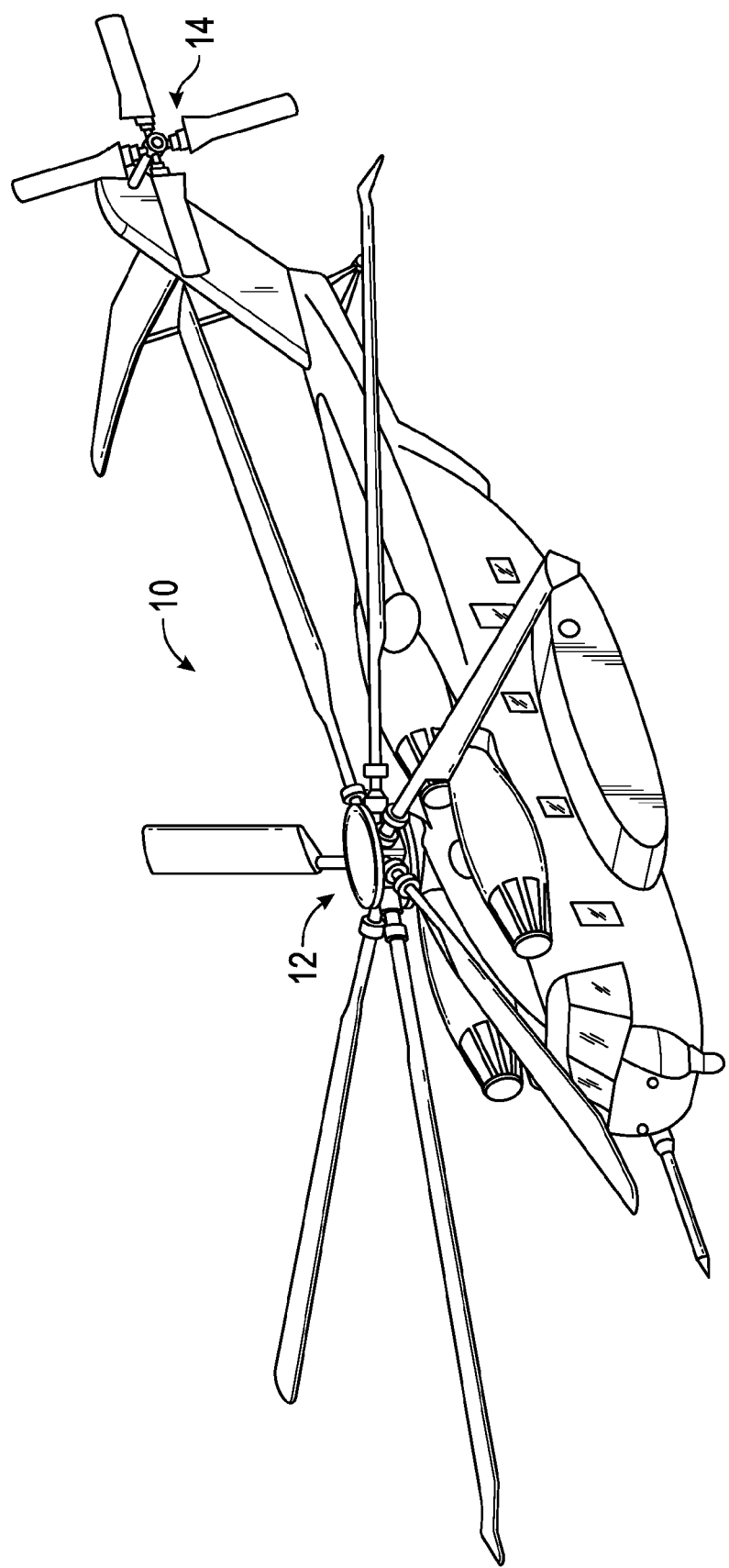
FIG. 1A is a general perspective side view of an exemplary aircraft.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described for providing an aircraft acceleration feedback signal with a high signal-to-noise ratio (SNR). The signal may be based on rotor blade bending.

FIG. 1A illustrates a general perspective view of a helicopter 10. The helicopter 10 includes a main rotor assembly 12 and tail rotor assembly 14. Although a particular helicopter configuration is illustrated and described in the disclosed embodiment, other configurations and/or machines may be used in connection with this disclosure.

Figure 1B:
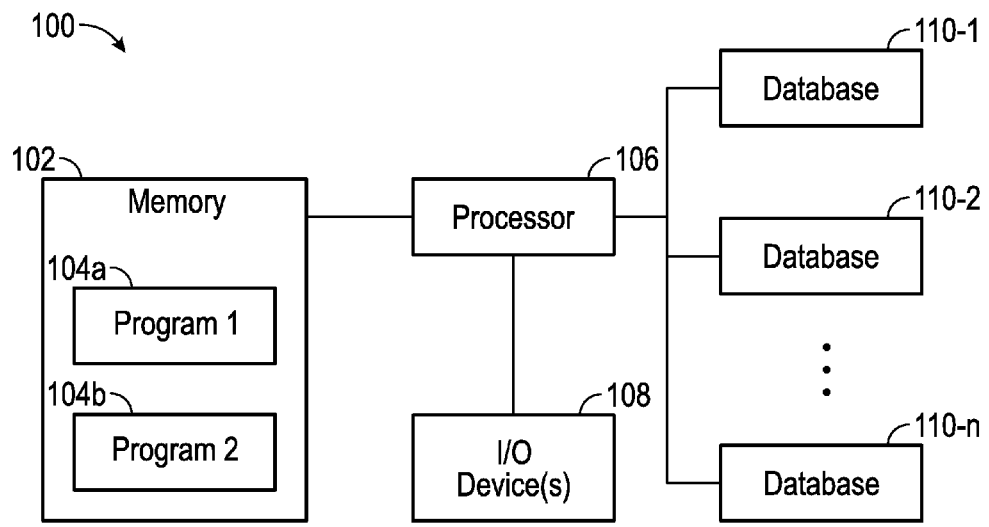
FIG. 1B is a schematic block diagram illustrating an exemplary computing system.

Referring to FIG. 1B, an exemplary computing system 100 is shown. Computing system 100 may be part of a flight control system of the aircraft 10. The system 100 is shown as including a memory 102. The memory 102 may store executable instructions. The executable instructions may be stored or organized in any manner and at any level of abstraction, such as in connection with one or more applications, processes, routines, procedures, methods, etc. As an example, at least a portion of the instructions are shown in FIG. 1B as being associated with a first program 104a and a second program 104b.

The instructions stored in the memory 102 may be executed by one or more processors, such as a processor 106. The processor 106 may be coupled to one or more input/output (I/O) devices 108. In some embodiments, the I/O device(s) 108 may include one or more of a keyboard or keypad, a touchscreen or touch panel, a display screen, a microphone, a speaker, a mouse, a button, a remote control, a control stick, a joystick, a printer, a telephone or mobile device (e.g., a smartphone), etc. The I/O device(s) 108 may be configured to provide an interface to allow a user to interact with the system 100.

As shown, the processor 106 may be coupled to a number 'n' of databases, 110-1, 110-2, 110-n. The databases 110 may be used to store data, such as data obtained from one or more sensors (e.g., strain gages). In some embodiments, the data may pertain to one or more parameters associated with a blade of an aircraft (e.g., aircraft 10).

The system 100 is illustrative. In some embodiments, one or more of the entities may be optional. In some embodiments, additional entities not shown may be included. In some embodiments, the entities may be arranged or organized in a manner different from what is shown in FIG. 1B. For example, in some embodiments, the memory 102 may be coupled to or combined with one or more of the databases 110.

Figure 1C:
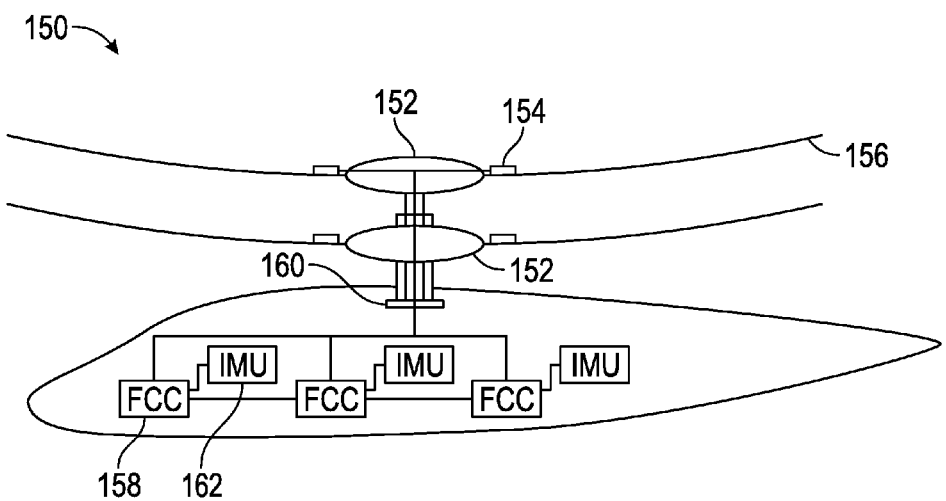
FIG. 1C is a schematic block diagram of an exemplary system environment.

Referring to FIG. 1C, a schematic block diagram of a system 150 in accordance with one or more embodiments is shown. The system 150 may be implemented on one or more types of aircraft, such a dual rotor 152 helicopter as shown in FIG. 1C.

The system 150 may include one or more sensors 154. In some embodiments, the sensors 154 may include strain gages. The sensors 154 may be implemented on, or associated with, blades 156 of the aircraft. In the example of FIG. 1C, one sensor 154 is present per blade 156. In some embodiments, more or less than one sensor 154 may be associated with a given blade 156.

The sensors 154 may be configured to detect a rotor blade flatwise (normal) bending moment. The bending moment signals may be transferred from the rotor(s) 152 to one or more flight control computers (FCCs) 158 through a data transfer system 160. In some embodiments, the data transfer system 160 may include a slipring (e.g., an optical slipring). An FCC 158 may process data from the sensors 154 and/or from an inertial measurement unit (IMU) 162. In some embodiments, the FCCs 158 may be associated with a fly-by-wire architecture or configuration.

Data associated with the IMU 162 may pertain to aircraft pitch or angular rates. Based on the pitch/angular rate, one or more parameters, such as acceleration may be derived. The data associated with the IMU 162 may generally be subject to noise. Use of the blade bending signals obtained from the sensors 154 may be used to complement use of the data associated with the IMU 162 in view of such noise. Furthermore, use of the data associated with the IMU 162 may help to provide for a quality pilot experience, at least insofar as a pilot's perception of stability or quality of flight may be more directly related to the IMU 162/fuselage of the aircraft relative to the sensors 154/rotor.

Figure 2:
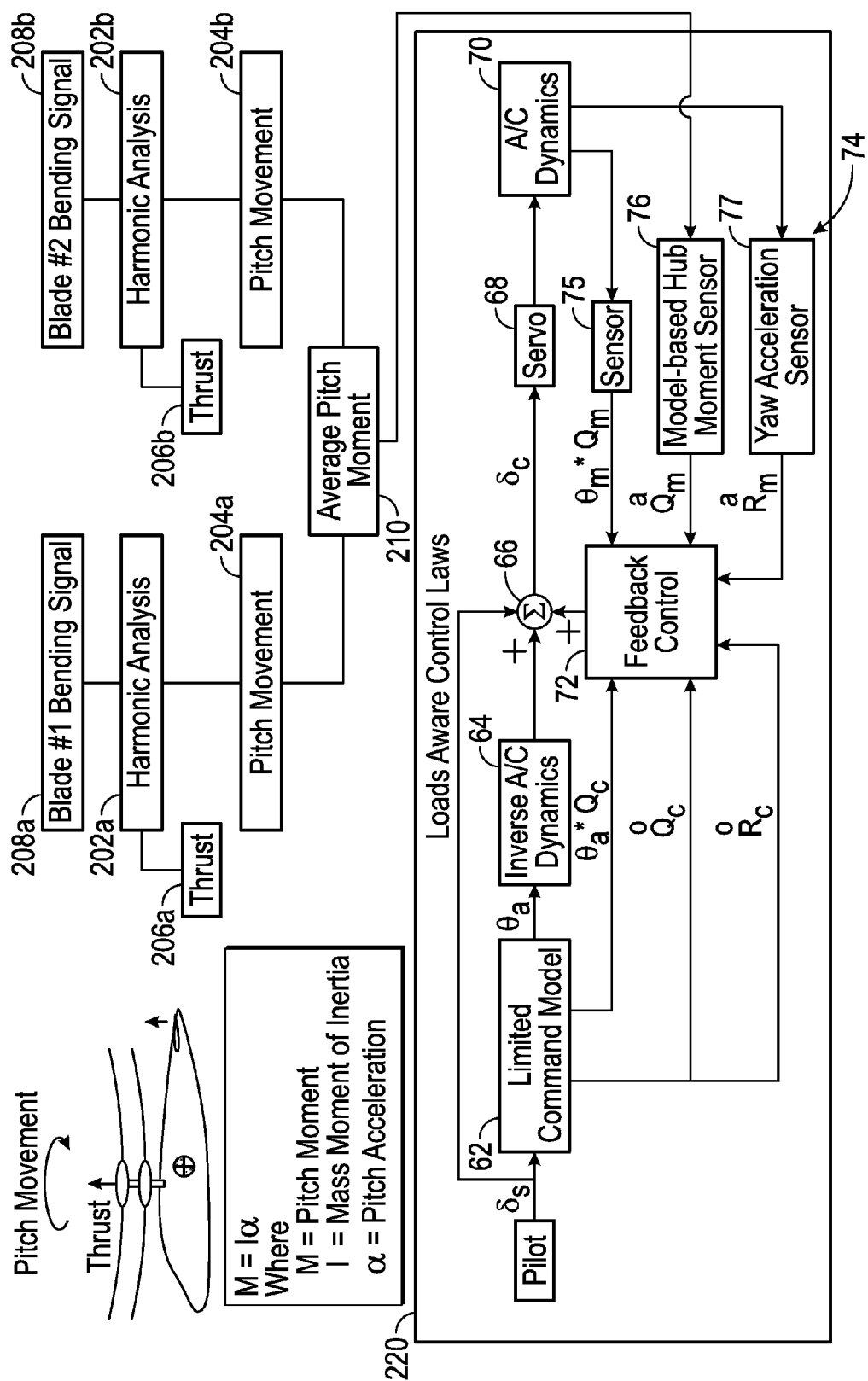
FIG. 2 is a block diagram of an exemplary system environment.

The raw blade normal bending signals obtained from the sensors 154 may vary periodically with the turning rotor(s) 152. Referring to FIG. 2, using one or more harmonic estimators 202 (a first of which is labeled 202a and a second of which is labeled 202b in the embodiment of FIG. 2), pitch moment (204a, 204b) (e.g., 1/rev pitch moment) and thrust (206a, 206b) may be extracted for a given blade bending signal (208a, 208b). If multiple sensors 154 are used, the signals may be weighted and/or averaged 210. For example, the blade bending signal 208a may be associated with a blade of an upper rotor, and the blade bending signal 208b may be associated with a blade of a lower rotor. The pitch moment 204 ("M") may be calculated as a product of a mass moment of inertia ("I") and a pitch acceleration ("α"). In this respect, if the pitch moment "M" (204) is obtained based on a harmonic analysis performed by a harmonic estimator 202, and if the mass moment of inertia "I" is assumed, then the pitch acceleration "α" may be calculated.

One or more gains may be present in connection with the harmonic estimator(s) 202a, 202b; these gains may be tuned to obtain a good signal-to-noise ratio (SNR) and numerical stability.

As shown in FIG. 2, the pitch moment(s) (204a, 204b) (or an average thereof 210) may serve as an input to a loads aware control laws 220. The control laws 220 may be configured to provide one or more feedback controls (labeled 72 in FIG. 2), potentially with respect to one or more parameters (e.g., angular rate, attitude, heading, acceleration, etc.). The feedback control 72 may strive to provide stability of an aircraft, potentially with respect to one or more reference inputs derived from one or more pilot commands.

The control laws 220 shown in FIG. 2 are taken from U.S. Pat. No. 7,970,498, and so, a complete (re-)description of the control laws 220 (and entities 62, 64, 66, 68, 70, 72, 74, 76, and 77 shown therein) is omitted for the sake of brevity. U.S. Pat. No. 7,970,498 is incorporated herein by way of reference.

In some embodiments, the control laws 220 may be implemented in connection with the FCCs 158. The FCCs 158 may process data from the sensors 154 and/or the IMUs 162 to provide for stability control. In some instances, the signals or data associated with the IMUs 162 may be associated with low-frequency content, whereas signals from the sensors 154 may be associated with high-frequency content.

Figure 3:
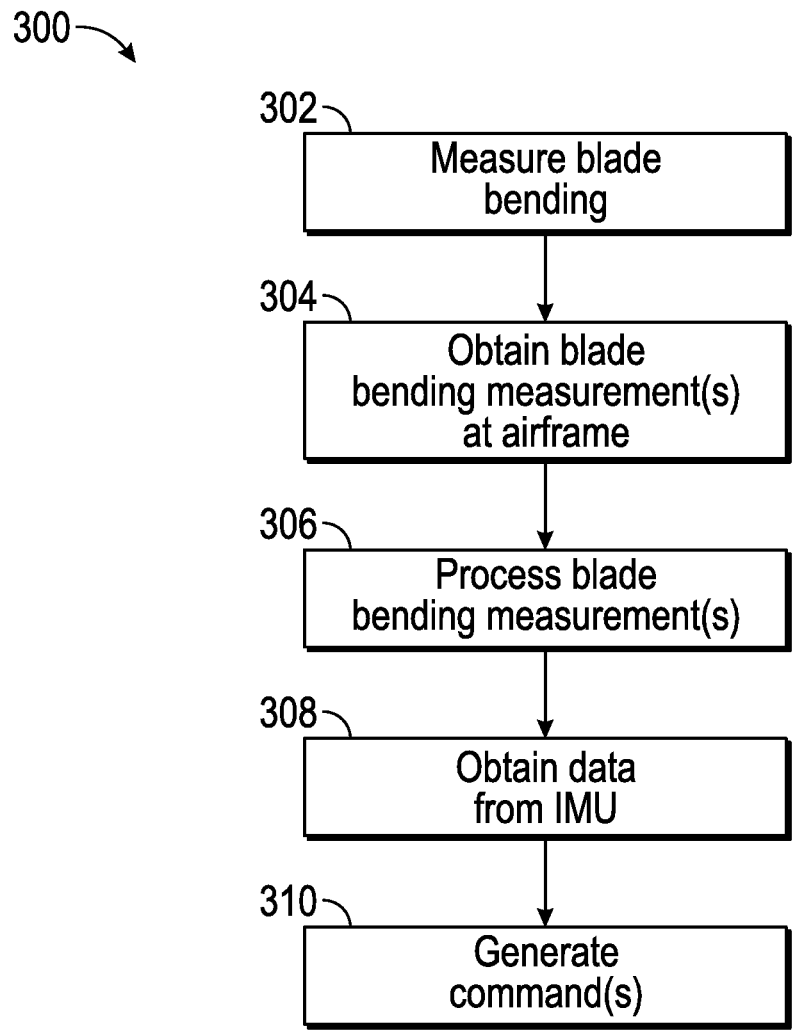
FIG. 3 illustrates a flow chart of an exemplary method.

Turning now to FIG. 3, a flow chart of an exemplary method 300 is shown. The method 300 may be executed by one or more systems, components, or devices, such as those described herein (e.g., the system 100 and/or the FCC 158). The method 300 may be used to provide one or more control signals or feedback to obtain stability for an aircraft.

In block 302, blade bending may be measured. For example, blade bending may be measured by the sensors 154.

In block 304, the blade bending measurements may be brought to an airframe. For example, the blade bending measurements may be provided to FCCs 158 via the data transfer system 160.

In block 306, the blade bending measurements may be processed to obtain hub moments.

In block 308, pitch or rate data may be obtained from the IMUs 162.

In block 310, the hub moments (block 306) and the IMU data (block 308) may be processed to generate commands or controls to stabilize the aircraft.

The method 300 is illustrative. In some embodiments, one or more of the blocks or operations (or a portion thereof) may be optional. In some embodiments, one or more additional blocks or operations not shown may be included. In some embodiments, the blocks or operations may execute in an order or sequence that is different from what is shown in FIG. 3.

As described herein, embodiments of the disclosure may be used in connection with one or more aircraft types, such as hingeless rotor helicopters, including X2 TECHNOLOGY™ helicopters and the Joint Multi-Role aircraft using X2 TECHNOLOGY™ features.

Aspects of the disclosure may be used to significantly reduce horizontal stabilizer size relative to conventional designs while maintaining adequate disturbance rejection. This reduction in size may correspond to a significant weight reduction on, e.g., an S-97 RAIDER™ helicopter. Additional savings may be realized in the tail cone structure and rotor due to reduced loads.

In some embodiments, a trade-off may be made between stability and horizontal tail area (HTA). For example, a combination of acceleration control gain and HTA may be selected based on one or more criteria. In some embodiments, rotor thrust may be used to further improve stability.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A rotorcraft comprising:
at least one rotor including a plurality of rotor blades; and
a flight control computer configured to:
   obtain a blade bending measurement from a sensor mounted to one of the plurality of rotor blades;
   process, the rotor blade bending measurement to obtain moment data for the rotorcraft;
   obtain data from an inertial measurement unit (IMU) operatively connected to the flight control computer, wherein the data obtained from the IMU pertains to at least one of a pitch of the rotorcraft and an angular rate of the rotorcraft; and
   process, the moment data and the data from the IMU to generate a command configured to stabilize the rotorcraft, wherein the command is based on a reference input, and wherein the reference input is based on at least one input provided by a pilot of the rotorcraft aircraft.

2. The rotorcraft according to claim 1, wherein the at least one rotor includes a first rotor including the first plurality of rotor blades and a second rotor including a second plurality of rotor blades rotor.

3. The rotorcraft according to claim 2, wherein the blade bending measurement includes a first blade measurement from one of the first plurality of rotor blades and a second rotor blade measure measurement from one of the second plurality of rotor blades.

4. The rotorcraft according to claim 3, wherein the flight control computer is configured to average the first blade bending measurement and the second blade bending measurement in obtaining the moment data.

5. The rotorcraft of claim 3, wherein the flight control computer is configured to:
obtain a third blade bending measurement from a sensor associated with another of the first plurality of rotor blades; and
process the third blade bending measurement in obtaining the moment data.

6. The rotorcraft according to claim 1, further comprising:
a slipring operatively connected to the plurality of rotor blades configured to transfer the blade bending measurement to the control computer.

7. The rotorcraft according to claim 1, wherein moment data for the rotorcraft includes pitch moment data.

* * * * *